United States Patent
Xu et al.

(10) Patent No.: US 10,997,040 B1
(45) Date of Patent: May 4, 2021

(54) SYSTEM AND METHOD FOR WEIGHT BASED DATA PROTECTION

(71) Applicant: EMC IP Holding Company, LLC, Hopkinton, MA (US)

(72) Inventors: Xinlei Xu, Beijing (CN); Larry Lei Wang, Chengdu (CN); Vamsi K. Vankamamidi, Newton, MA (US); Ming Wang, Chengdu (CN); Qiu Zhong, Sichuan (CN); Alex Wang, Zi Yang (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 50 days.

(21) Appl. No.: 16/670,303

(22) Filed: Oct. 31, 2019

(51) Int. Cl.
*G06F 11/08* (2006.01)
*G06F 11/14* (2006.01)

(52) U.S. Cl.
CPC ...... *G06F 11/1469* (2013.01); *G06F 11/1451* (2013.01); *G06F 2201/82* (2013.01)

(58) Field of Classification Search
CPC ............. G06F 11/1048; G06F 11/1076; G06F 11/1088; G06F 11/1092; G06F 11/1666; G06F 11/2007; G06F 11/2041; G06F 11/1451; G06F 11/1469; G06F 2201/82
USPC ..................... 714/6.22, 6.23, 6.24
See application file for complete search history.

(56) References Cited

U.S. PATENT DOCUMENTS

| | | | |
|---|---|---|---|
| 8,442,952 B1 * | 5/2013 | Armangau | G06F 16/1752 707/686 |
| 9,256,381 B1 * | 2/2016 | Fultz | G06F 3/0617 |
| 10,642,690 B1 * | 5/2020 | Tian | G06F 3/0643 |

* cited by examiner

*Primary Examiner* — Chae M Ko
(74) *Attorney, Agent, or Firm* — Brian J. Colandreo; Mark H. Whittenberger; Holland & Knight LLP

(57) ABSTRACT

A method, computer program product, and computer system for determining, by a computing device, a weight of an indirect block page. The weight of the indirect block page may be compared to a threshold. It may be determined that the weight of the indirect block page is greater than the threshold. A copy of the indirect block page may be created as a backup page based upon, at least in part, determining that the weight of the indirect block page is greater than the threshold.

20 Claims, 8 Drawing Sheets

SYSTEM AND METHOD FOR WEIGHT BASED DATA PROTECTION

BACKGROUND

Some storage systems may not have backup copies for each logic page used to locate data. As such, in case there are multiple corruptions, to bring the system offline for the recovery, a file system check may be relied upon to validate consistency of metadata in multiple locations, and remove any inconsistency by correcting any corrupted metadata. Generally, the check may find all of the connected space that is visible to the user volumes. Depending on the corruption type and corrupted objects, the check may encounter scenarios where recovery is not possible, as corrupted pages are not able to make a connection with the rest of the data structure during/after the browsing, hence that all the data represented by the corrupted pages may be required to be removed from the data structure.

BRIEF SUMMARY OF DISCLOSURE

In one example implementation, a method, performed by one or more computing devices, may include but is not limited to determining, by a computing device, a weight of an indirect block page. The weight of the indirect block page may be compared to a threshold. It may be determined that the weight of the indirect block page is greater than the threshold. A copy of the indirect block page may be created as a backup page based upon, at least in part, determining that the weight of the indirect block page is greater than the threshold.

One or more of the following example features may be included. The weight of the indirect block page may be based upon, at least in part, one or more characteristics of the indirect block page. The one or more characteristics may include one or more of a type of the indirect block page, a number of valid entries in the indirect block page, and a reference count of the indirect block page. The copy of the indirect block page may be stored in a spare space used for RAID rebuilding. The weight of the indirect block page may be determined based upon, at least in part, flushing the indirect block page. It may be determined that the indirect block page is corrupt. The indirect block page may be replaced with the copy of the indirect block page.

In another example implementation, a computing system may include one or more processors and one or more memories configured to perform operations that may include but are not limited to determining, by a computing device, a weight of an indirect block page. The weight of the indirect block page may be compared to a threshold. It may be determined that the weight of the indirect block page is greater than the threshold. A copy of the indirect block page may be created as a backup page based upon, at least in par, determining that the weight of the indirect block page is greater than the threshold.

One or more of the following example features may be included. The weight of the indirect block page may be based upon, at least in part, one or more characteristics of the indirect block page. The one or more characteristics may include one or more of a type of the indirect block page, a number of valid entries in the indirect block page, and a reference count of the indirect block page. The copy of the indirect block page may be stored in a spare space used for RAID rebuilding. The weight of the indirect block page may be determined based upon, at least in part, flushing the indirect block page. It may be determined that the indirect block page is corrupt. The indirect block page may be replaced with the copy of the indirect block page.

In another example implementation, a computer program product may reside on a computer readable storage medium having a plurality of instructions stored thereon which, when executed across one or more processors, may cause at least a portion of the one or more processors to perform operations that may include but are not limited to determining, by a computing device, a weight of an indirect block page. The weight of the indirect block page may be compared to a threshold. It may be determined that the weight of the indirect block page is greater than the threshold. A copy of the indirect block page may be created as a backup page based upon, at least in part, determining that the weight of the indirect block page is greater than the threshold.

One or more of the following example features may be included. The weight of the indirect block page may be based upon, at least in part, one or more characteristics of the indirect block page. The one or more characteristics may include one or more of a type of the indirect block page, a number of valid entries in the indirect block page, and a reference count of the indirect block page. The copy of the indirect block page may be stored in a spare space used for RAID rebuilding. The weight of the indirect block page may be determined based upon, at least in part, flushing the indirect block page. It may be determined that the indirect block page is corrupt. The indirect block page may be replaced with the copy of the indirect block page.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
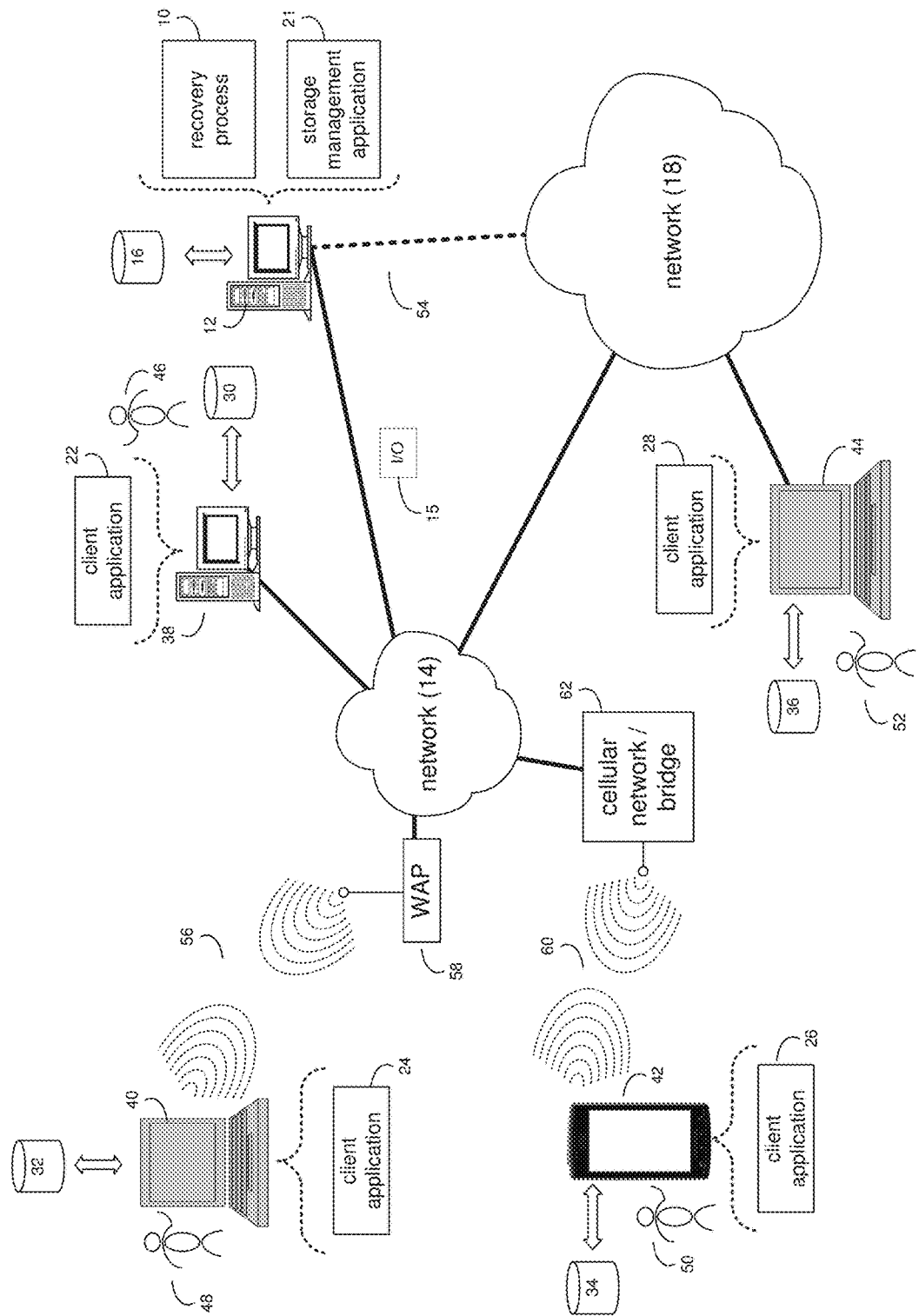
FIG. 1 is an example diagrammatic view of a recovery process coupled to an example distributed computing network according to one or more example implementations of the disclosure.

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable. RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language. PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown recovery process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer (s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a recovery process, such as recovery process 10 of FIG. 1, may determine, by a computing device, a weight of an indirect block page. The weight of the indirect block page may be compared to a threshold. It may be determined that the weight of the indirect block page is greater than the threshold. A copy of the indirect block page may be created as a backup page based upon, at least in part, determining that the weight of the indirect block page is greater than the threshold.

In some implementations, the instruction sets and subroutines of recovery process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, recovery process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, recovery process 10 and/or storage management application 21 may be accessed via one or more of client applications 22, 24, 26, 28. In some implementations, recovery process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within recovery process 10, a component of recovery process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of recovery process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of recovery process 10 (and vice versa). Accordingly, in some implementations, recovery process 10 may be a purely server-side application, a purely client-side application, or a hybrid server-side/client-side application that is cooperatively executed by one or more of client applications 22, 24, 26, 28 and/or recovery process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, recovery process 10, and storage management application 21, taken singly or in any combination, may effectuate some or all of the same functionality, any description of effectuating such functionality via one or more of client applications 22, 24, 26, 28, recovery process 10, storage management application 21, or combination thereof, and any described interaction(s) between one or more of client applications 22, 24, 26, 28, recovery process 10, storage management application 21, or combination thereof to effectuate such functionality, should be taken as an example only and not to limit the scope of the disclosure.

In some implementations, one or more of users 46, 48, 50, 52 may access computer 12 and recovery process 10 (e.g., using one or more of client electronic devices 38, 40, 42, 44) directly through network 14 or through secondary network 18. Further, computer 12 may be connected to network 14 through secondary network 18, as illustrated with phantom link line 54. Recovery process 10 may include one or more user interfaces, such as browsers and textual or graphical user interfaces, through which users 46, 48, 50, 52 may access recovery process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but am not limited to, data write requests (e.g., a request that content be written to computer 12) and data read requests (e.g., a request that content be read from computer 12).

Figure 2:
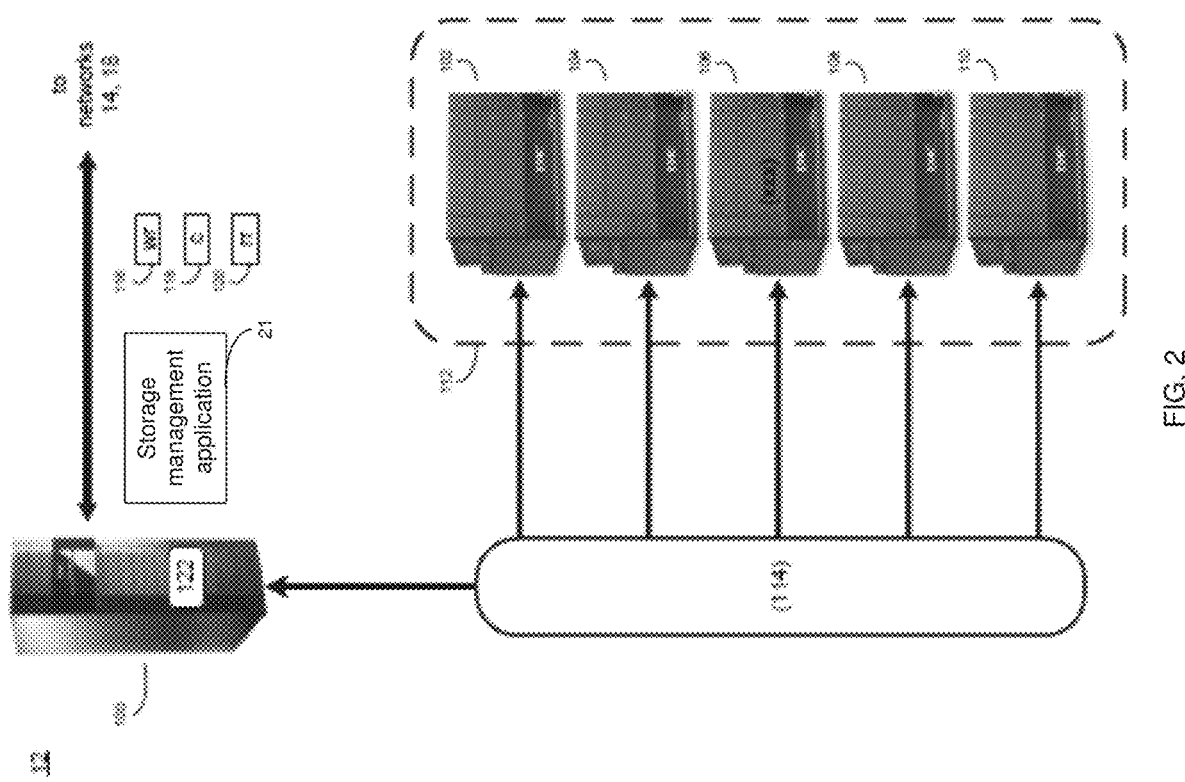
FIG. 2 is an example diagrammatic view of a storage system of FIG. 1 according to one or more example implementations of the disclosure.
Figure 3:
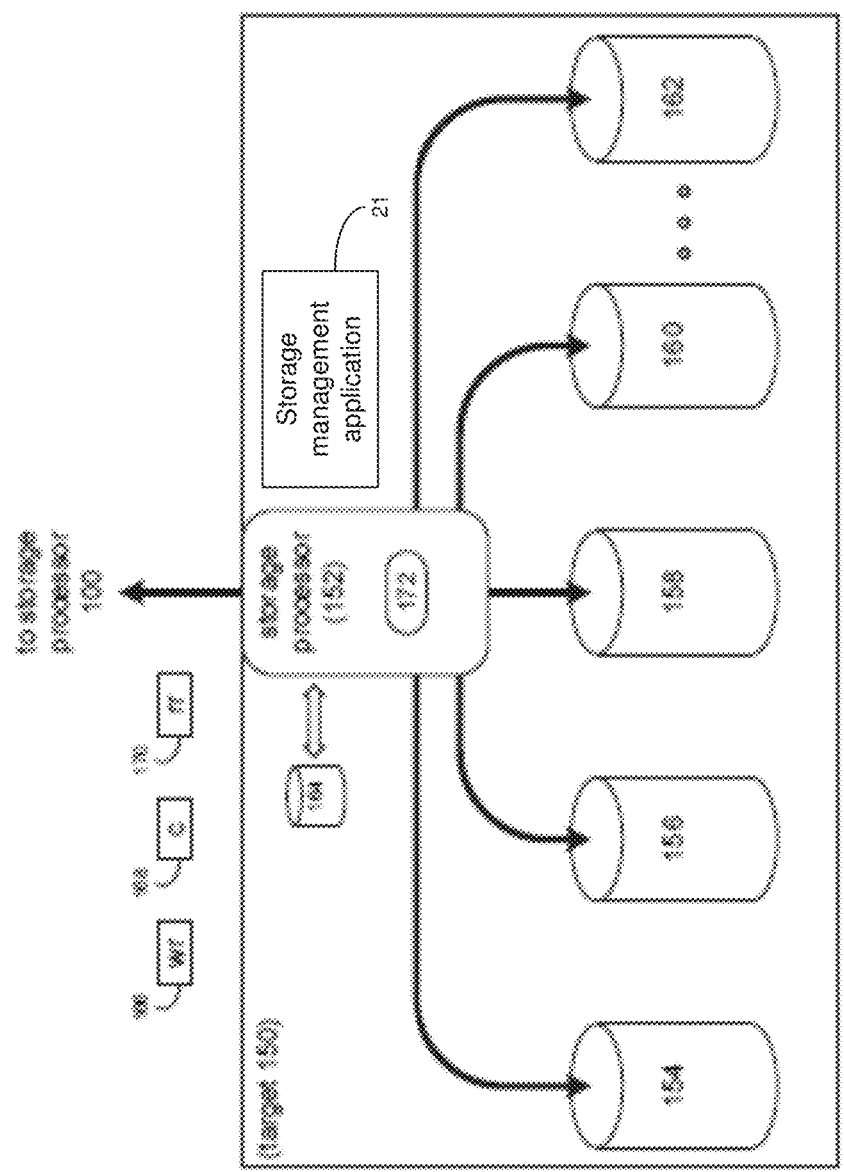
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon. e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™, VNX™, TRIDENT™, or Unity™ system offered by Dell EMC™ of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or recovery process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VPLEX™, VNX™, TRIDENT™, or Unity™ system offered by Dell EMC™ of Hopkinton, Mass. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

Figure 4:
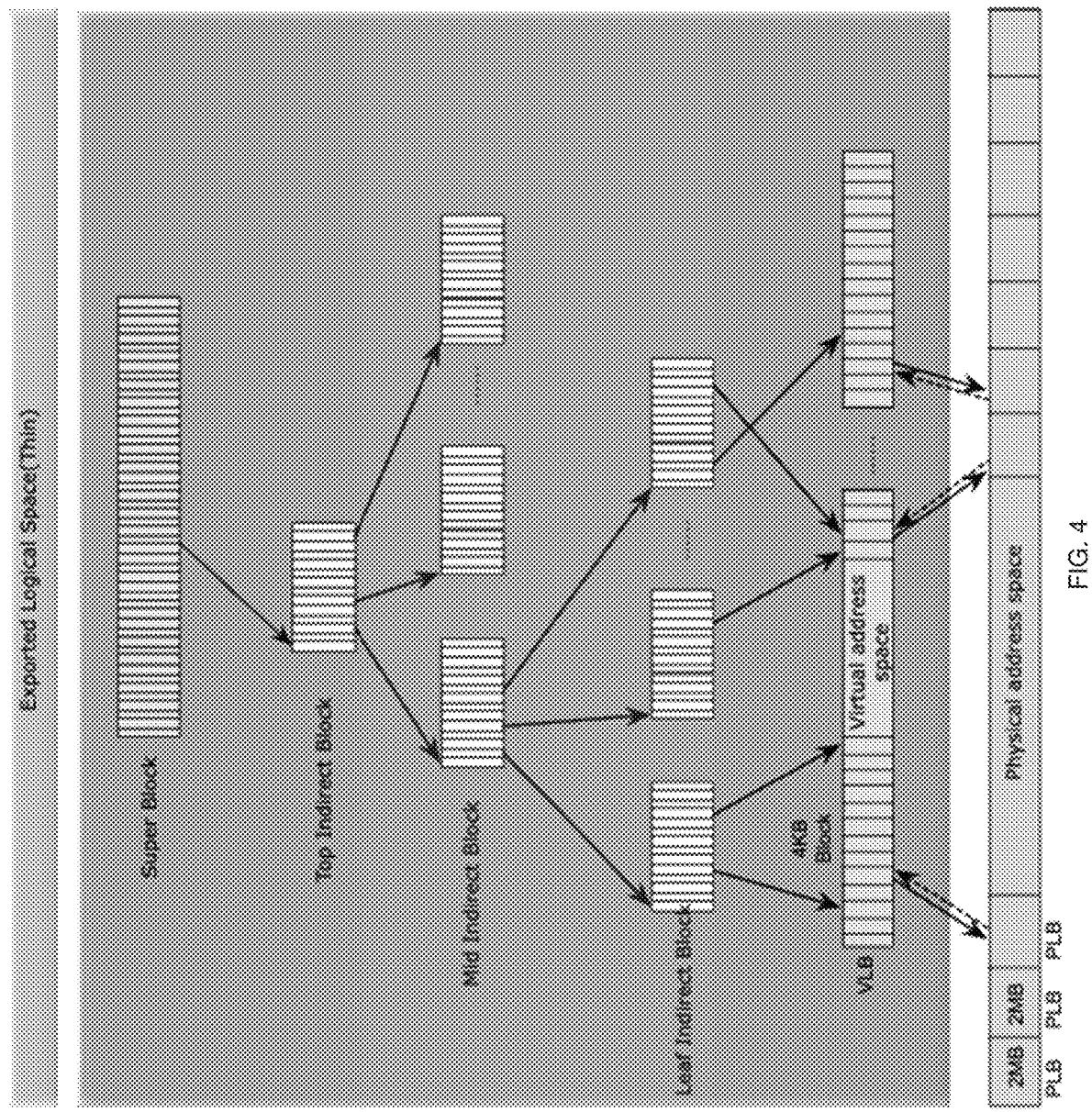
FIG. 4 is an example diagrammatic view of a storage system environment.

Referring at least to the example FIG. 4, an example storage system environment 400 with indirect block mapping in mapper is shown. Generally, mapper may export logical storage to the frontend (e.g., block interface) and may map it to different tiers of physical storage consumed from RAID. Mapper may interact with RAID for backend I/O. RAID may consume all of the available storage devices (e.g., disks) in the system, binds each type of those disks into RAID Groups/Tiers/Ubers to export storage space to the Mapper. It may interact with the backend to issue disk IOs and handle disk errors. As shown in FIG. 4, storage system environment 400 may use the mapping module called the Indirect Block (IDB) to manage the data and space, and may contain Top IDB, Mid IDB, Leaf IDB, VLB, and PLB. All these data structure may be include metadata data for whole system, which once there is a lost or corrupt IDB, may cause data loss, data unavailable, and other serious consequences.

Some storage systems may not have backup copies for each logic page, so in case there are multiple corruptions to bring the DP stack offline for the recovery, the Mapper File System Check (FSCK) may be relied upon to validate consistency of metadata both in the boot tier and metadata tier, and remove any inconsistency by correcting any corrupted metadata. Generally, the FSCK finds all of the connected space that is visible to the user volumes. Depending on the corruption type and corrupted objects. FSCK has scenarios where recovery is not possible with existing metadata in Mapper, as the corrupted pages are not able to make a connection with the rest of the block tree structure during/after the browsing, hence that all the data represented by the corrupted pages must be removed from the block tree structure.

Therefore, as will be discussed below, the present disclosure may introduce a weight calculation framework designed to improve the faults containment and recovery ability of the storage system (e.g., mapper) components. In some implementations, the present disclosure may be integrated into existing Trident Mapper architecture (or other storage system architecture) without impacting existing components. By including the weights calculation framework, the present disclosure may gain the ability to calculate the weights for the mapper pages so that the key pages with more weights may be backed up for the fault containment and recovery purposes. Thus the present disclosure may provide the example and non-limiting advantages of fast metadata recovery (e.g., the corrupted metadata may be recovered from the backup copies before the FSCK recovery phase), little or no extra special storage space needed, as the backup copies may be stored in the spare space of the RAID, and little or no performance impact on the existing data path, as there may be no change from the current I/O path.

Figure 5:
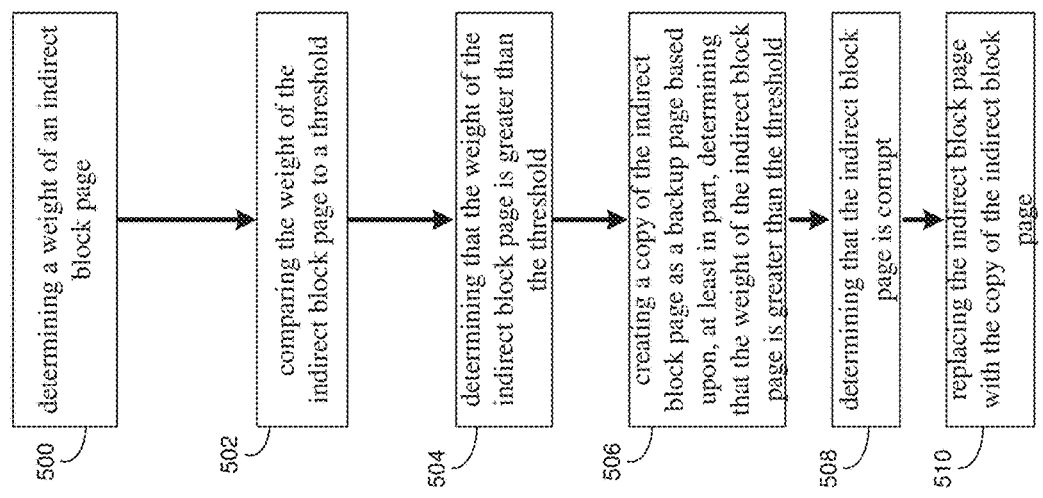
FIG. 5 is an example flowchart of a recovery process according to one or more example implementations of the disclosure.

The Recovery Process:

As discussed above and referring also at least to the example implementations of FIG. 5-XX, recovery process 10 may determine 500, by a computing device, a weight of an indirect block page. Recovery process 10 may compare 502 the weight of the indirect block page to a threshold. Recovery process 10 may determine 504 that the weight of the indirect block page is greater than the threshold. Recovery process 10 may create 506 a copy of the indirect block page as a backup page based upon, at least in part, determining that the weight of the indirect block page is greater than the threshold.

In some implementations, recovery process 10 may determine 500, by a computing device, a weight of an indirect block page. For instance, the weighting of the indirect block pages (e.g., mapper pages) may reduce the fault domain. In some implementations, a weight may be determined 500 for each node in the data structure (e.g., map tree). As will be discussed in more detail below, the weights may be assigned depending on the following example factors: the upper level page having the most weight, the shared page having the most weight, and the hotter page shared with the most weight. As will also be discussed below, the page with enough weight may be identified as being a candidate to be backed up to other tiers, e.g., hot tier. Thus, recovery process 10 may determine 500 a weight for each page in the data structure (e.g., tree), such as the data structure shown in FIG. 4. In case some of the pages are corrupt in the tree, recovery process 10 may go through those weights and determine whether or not the corrupted page needs to be removed or recovered.

Assume for example purposes only that the data structure for the pages is a B-tree structure (e.g., of the mapper). Different IDB pages may have a different addressing space range. For instance, the upper level page or the page with multiple reference counts may be more important, as it may address more space ranges than a lower page, which deserves more protection. Based at least on that, recovery process 10 may determine a scalar type (e.g., weight for each IDB to measure this page's importance). As will be discussed below, once the calculated weight is big enough (e.g., compared with some threshold), recovery process 10 may decide that the page is important enough that it needs to be copied to some place to serve as a backup page.

In some implementations, the weight of the indirect block page may be based upon, at least in part, one or more characteristics of the indirect block page. For example, in some implementations, the one or more characteristics may include one or more of a type of the indirect block page, a number of valid entries in the indirect block page, and a reference count of the indirect block page. For instance, the weight may be impacted by type, entry, and shared, so the equation may be shown below for example purposes only:

$$w=f(type,entry,share)$$

A non-limiting example formula used to calculate the weights is shown below:

$$f(type,entry,share)=12*\delta(type=leaf)+21*\delta(type=mid)+30*\delta(type=top)+\log_2 entry+\log_2 share$$

Generally, the type characteristic may mean the type of IDB page, whose values may include, e.g., leaf page/mid page/top page. Because one entry in the leaf page/mid page/top page could represent, e.g., 4 KB/2 MB/GB, etc. capacity in the namespace, recovery process 10 may calculate their logarithm to the base of 2 as the initial weights of the leaf page/mid page/top page, which in the example is 12/21/30 respectively. Take the leaf page as one example. If the IDB page were a leaf page, it would have a higher weight than a mid page and top page. Similarly, if the IDB page were a mid page, it would have a higher weight than a top page.

Generally, the entry characteristic may include, e.g., the number of valid entries inside the IDB page. Take the leaf page as one example. If the IDB page had X number of valid entries, it would have a higher weight than if the IDB page had Y number of valid entries (assuming X is greater than Y).

Generally, the share characteristic may include, e.g., the copy/reference count per the IDB page. Take the leaf page as one example. If the IDB page had X number of copy/reference counts, it would have a higher weight than if the IDB page had Y number of copy/reference counts (assuming X is greater than Y).

In some implementations, recovery process 10 may compare 502 the weight of the indirect block page to a threshold, and in some implementations, recovery process 10 may determine 504 that the weight of the indirect block page is greater than the threshold. By using the above example formula, recovery process 10 may obtain the weight for each of the MD pages (e.g., the IDB pages). In the example, recovery process 10 may compare 502 the weight to some threshold T, to determine 504 whether or not the weight of the IDB is greater than (or equal to) T.

In some implementations, recovery process 10 may create 506 a copy of the indirect block page as a backup page based upon, at least in part, determining that the weight of the indirect block page is greater than the threshold. For example, when the weight >T, recovery process 10 may create 506 a backup of this IDB page. For instance, assume for example purposes only that the threshold is 20, and that the weight for the IDB is 21. In the example, the IDB page (and any page with a weight higher than 20) may be collected, copied, and stored as a backup.

In some implementations, as backup for the pages is based upon weight, the data structure may indicate the metadata page type, and the logical block address (LBA) of the original pages to be backed up. The data structure may thus add three types to the IdpPageType used to identify backup metadata pages:

LOGICAL_DESCRIPTOR_TYPE_TOPBacked—the backup page for TOP.
LOGICAL_DESCRIPTOR_TYPE_MIDBacked—the backup page for MID.
LOGICAL_DESCRIPTOR_TYPE_LEAFBacked—the backup page for LEAF.

In some implementations, a mBackedLBA pointer may be added to the IdpPageOnDiskLayout. If the page is one of the three backup types (TOPBacked, MIDBacked, LEAFBacked), mBackedLBA may point to the original page's LBA.

Based on this example design, by only adding 3 types and one pointer, it will not require any change to the existing data structure used in current systems.

In some implementations, the copy of the indirect block page may be stored in a spare space used for RAID rebuilding. For instance, RAID may always try to reserve at least the largest drive space in one RAID Resilient Set (RRS), which may generally be described as the physical fault domain, where one RRS may be specifically bounded to one device type. When one drive is offline/broken (e.g., corrupted), RAID may rebuild the data into the spare space and continue to provide data protection. Thus, in the example, recovery process 10 may use the spare space to store the backed-up MD page copy.

Figure 6:
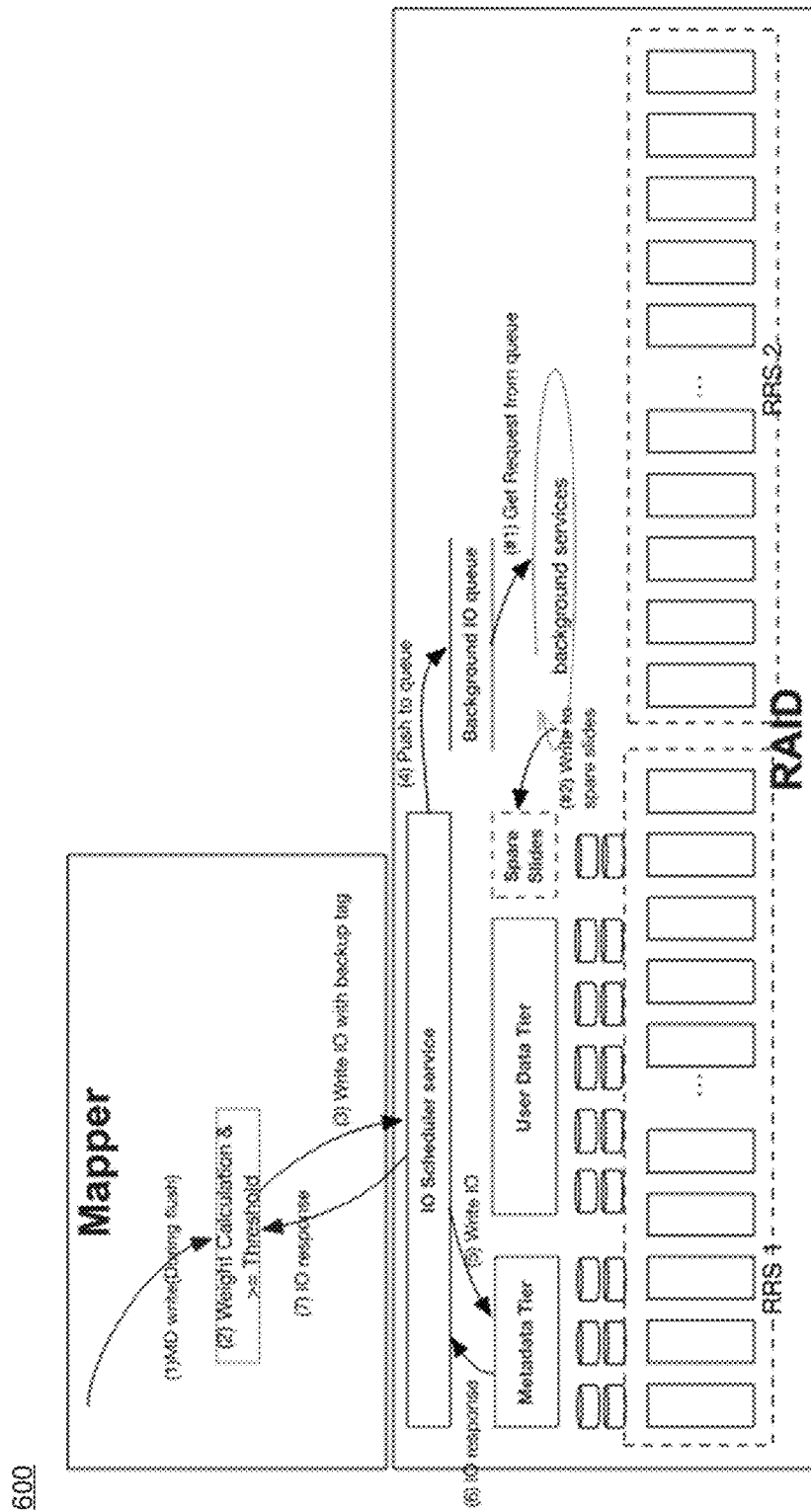
FIG. 6 is an example process flow of a recovery process according to one or more example implementations of the disclosure.

In some implementations, the weight of the indirect block page may be determined based upon, at least in part, flushing the indirect block page. For instance, and referring at least to the example implementation of FIG. 6, an example process flow 600 executed by recovery process 10 is shown. In some implementations, when flushing a metadata (e.g., IDB) page, e.g., from a logger metadata buffer ring, mapper (e.g., via recovery process 10) may check if this page is a newly allocated metadata page or if it is a page update. In some implementations, when it is a new metadata page, recovery process 10 may go through the normal process to newly allocate a metadata page, but initialized to 0 to store the weight algorithm. In some implementations, when it is a metadata page update, recovery process 10 may perform an in memory update of the metadata page, calculate a new weight, and compare to the weight threshold (as discussed above). As such, if the weight <T recovery process 10 may send a normal write I/O, and if the weight >=T, recovery process 10 may add an update tag, letting RAID background know to write to a new place (e.g., to make the copy). As an example and non-limiting advantage, FIG. 6 shows that there is no performance impact for flush path performance and no extra space is required.

Figure 7:
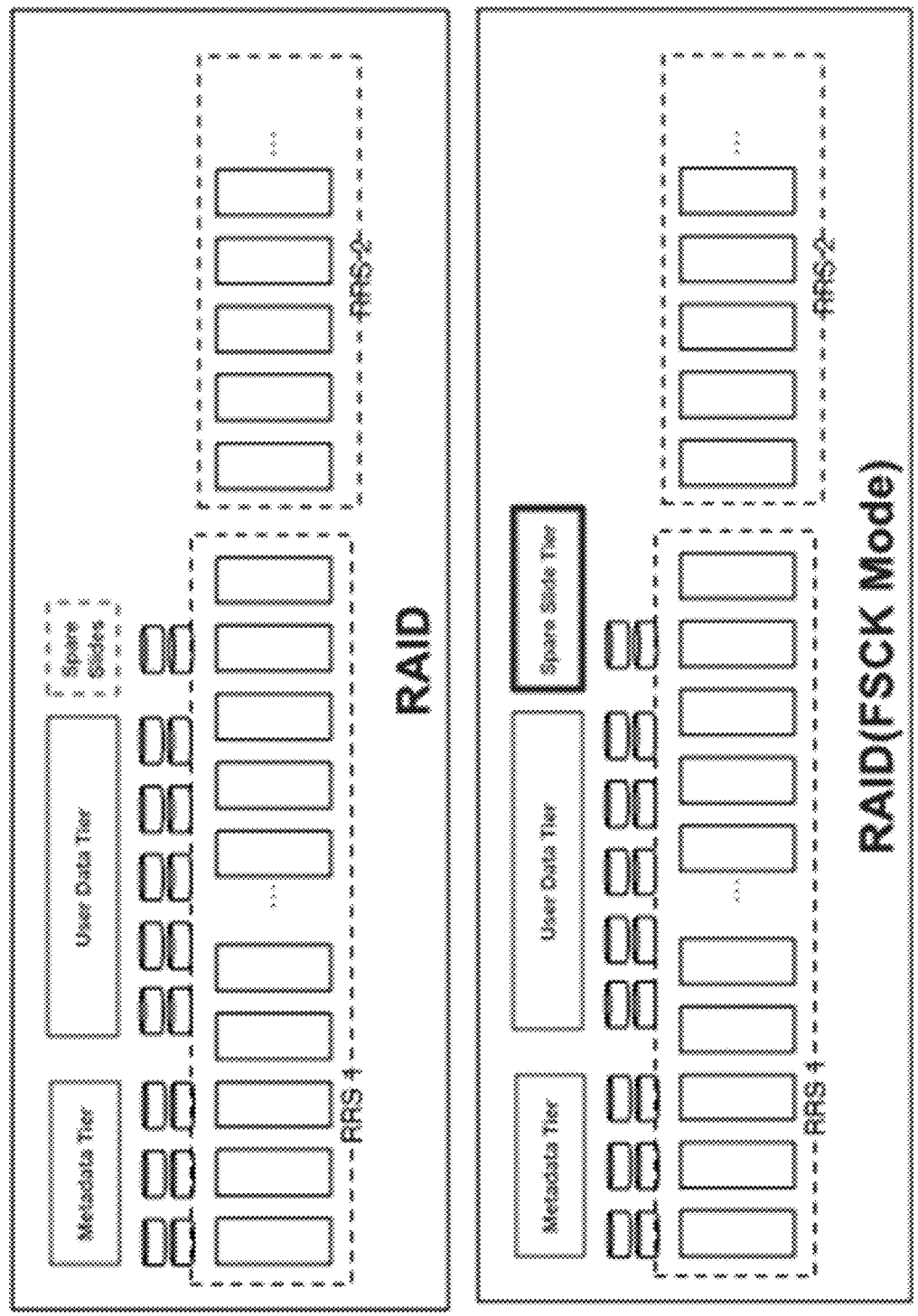
FIG. 7 is an example RAID FSCK mode of a recovery process according to one or more example implementations of the disclosure.

In some implementations, and referring at least to the example implementation of FIG. 7, an example RAID FSCK mode 700 is shown exposing the spare slide tier. For instance, during boot up, if the bootup & shutdown service decides to let the node enter FSCK recover mode, recovery process 10 may set the flag enable_recovery_boot_mode=true into RAID database, and during RAID boot up. RAID (e.g., via recovery process 10) may check the enable_recovery_boot_mode. If enable_recoveryboot_mode=false. RAID (e.g., via recovery process 10) may use a normal boot up process and may not expose the spare slides to mapper. If enable_recovery_boot_mode=true, RAID (e.g., via recovery process 10) may boot up in recovery mode, and group the spare disk slides to expose the space as a Spare Slide Tier, where there may be no RAID redundancy for this tier. RAID only needs to map the physical spare disk slides to a continues virtual space address to mapper.

Figure 8:
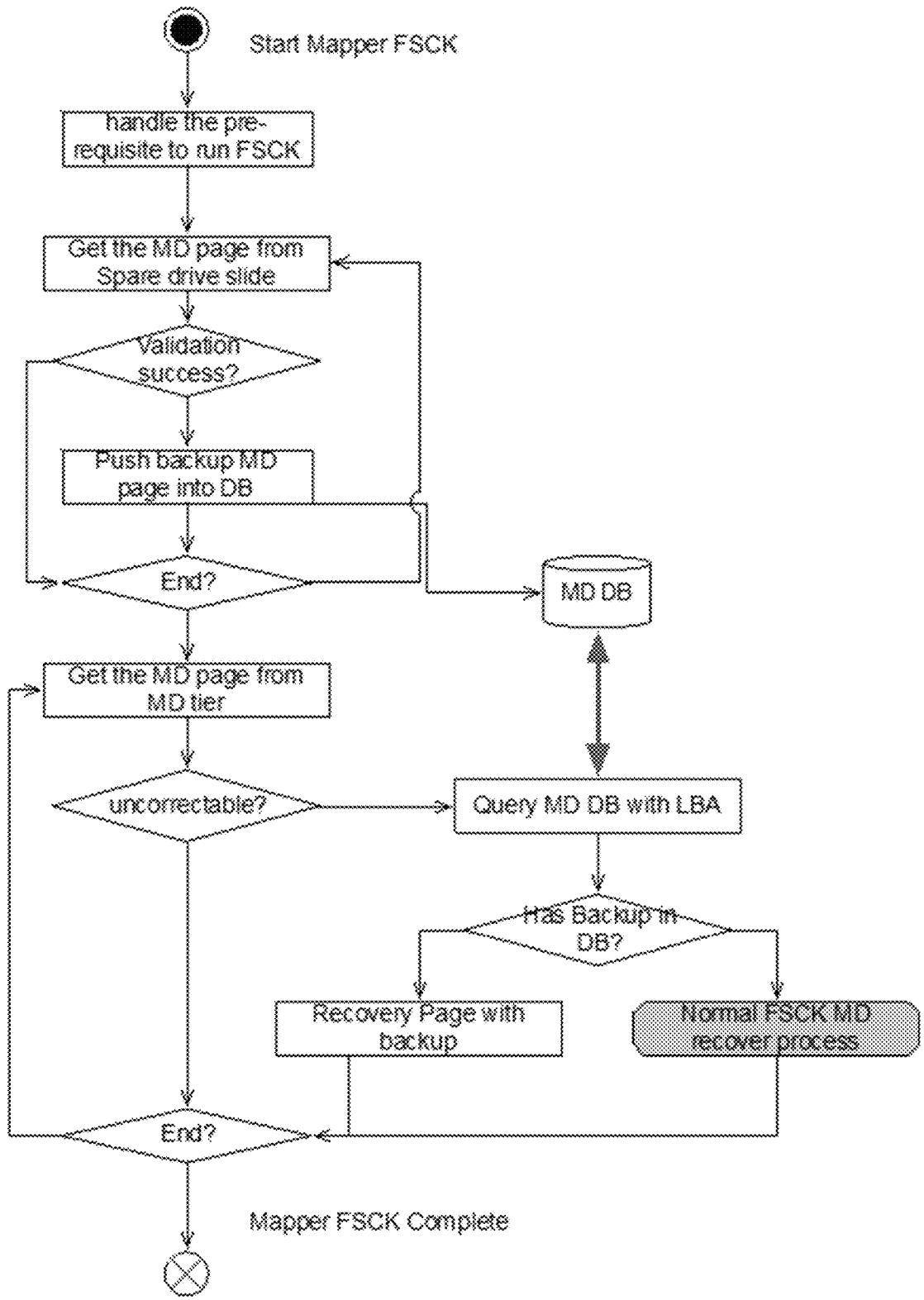
FIG. 8 is an example flowchart of a recovery process according to one or more example implementations of the disclosure.

In some implementations, recovery process 10 may determine 508 that the indirect block page is corrupt, and in some implementations, recovery process 10 may replace 510 the indirect block page with the copy of the indirect block page. For example, and referring at least to the example implementation of FIG. 8, an example flowchart of an FSCK recovery process 800 of recovery process 10 is shown. It will be appreciated that the flowcharts from FIG. 5, FIG. 6, and FIG. 8 may be combined in any combination. In some implementations, when in FSCK recovery mode, recovery process 10 may run RAID FSCK to make sure that RAID can bring it up, then FSCK (e.g., via recovery process 10) may run the (mapper in this example) FSCK. At this stage, RAID (e.g., via recovery process 10) may expose the Mapper metadata (MD) Tier, User Data Tier and Spare Slides Tier to the FSCK. FSCK (e.g., via recovery process 10) may scan the Spare Slides Tier to check the backup metadata pages, and validate the page again. If the metadata validation passes, FSCK (e.g., via recovery process 10) may put the page in the FSCK database and use the original metadata page's LBA as an index.

The FSCK (e.g., via recovery process 10) may scan the Mapper MD tier, validate the MD page again to determine 508 the corrupted metadata page. In some implementations, when the FSCK finds the corrupted metadata page, recovery process 10 may use this page's LBA to search the FSCK database to see if there is a backup. If there is a backup page, FSCK (e.g., via recovery process 10) may directly replace 510 the original (corrupted) page with the created backup page, and avoid the metadata page cross-reference check and calculation to recover the page. If there is no backup page. FSCK (e.g., via recovery process 10) may scan the full metadata tier and use the cross-reference check and calculation to recover the corrupted page.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B. and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:
1. A computer-implemented method comprising:
  determining, by a computing device, a weight of an indirect block page;
  comparing the weight of the indirect block page to a threshold;
  determining that the weight of the indirect block page is greater than the threshold; and
  creating a copy of the indirect block page as a backup page based upon, at least in part, determining that the weight of the indirect block page is greater than the threshold.

2. The computer-implemented method of claim 1 wherein the weight of the indirect block page is based upon, at least in part, one or more characteristics of the indirect block page.

3. The computer-implemented method of claim 2 wherein the one or more characteristics include one or more of a type of the indirect block page, a number of valid entries in the indirect block page, and a reference count of the indirect block page.

4. The computer-implemented method of claim 1 wherein the copy of the indirect block page is stored in a spare space used for RAID rebuilding.

5. The computer-implemented method of claim 1 wherein the weight of the indirect block page is determined based upon, at least in part, flushing the indirect block page.

6. The computer-implemented method of claim 1 further comprising determining that the indirect block page is corrupt.

7. The computer-implemented method of claim 6 further comprising replacing the indirect block page with the copy of the indirect block page.

8. A computer program product residing on a computer readable storage medium having a plurality of instructions stored thereon which, when executed across one or more processors, causes at least a portion of the one or more processors to perform operations comprising:
   determining a weight of an indirect block page;
   comparing the weight of the indirect block page to a threshold;
   determining that the weight of the indirect block page is greater than the threshold; and
   creating a copy of the indirect block page as a backup page based upon, at least in part, determining that the weight of the indirect block page is greater than the threshold.

9. The computer program product of claim 8 wherein the weight of the indirect block page is based upon, at least in part, one or more characteristics of the indirect block page.

10. The computer program product of claim 9 wherein the one or more characteristics include one or more of a type of the indirect block page, a number of valid entries in the indirect block page, and a reference count of the indirect block page.

11. The computer program product of claim 8 wherein the copy of the indirect block page is stored in a spare space used for RAID rebuilding.

12. The computer program product of claim 8 wherein the weight of the indirect block page is determined based upon, at least in part, flushing the indirect block page.

13. The computer program product of claim 8 wherein the operations further comprise determining that the indirect block page is corrupt.

14. The computer program product of claim 13 wherein the operations further comprise replacing the indirect block page with the copy of the indirect block page.

15. A computing system including one or more processors and one or more memories configured to perform operations comprising:
   determining a weight of an indirect block page;
   comparing the weight of the indirect block page to a threshold;
   determining that the weight of the indirect block page is greater than the threshold; and
   creating a copy of the indirect block page as a backup page based upon, at least in part, determining that the weight of the indirect block page is greater than the threshold.

16. The computing system of claim 15 wherein the weight of the indirect block page is based upon, at least in part, one or more characteristics of the indirect block page.

17. The computing system of claim 16 wherein the one or more characteristics include one or more of a type of the indirect block page, a number of valid entries in the indirect block page, and a reference count of the indirect block page.

18. The computing system of claim 15 wherein the copy of the indirect block page is stored in a spare space used for RAID rebuilding.

19. The computing system of claim 15 wherein the weight of the indirect block page is determined based upon, at least in part, flushing the indirect block page.

20. The computing system of claim 15 wherein the operations further comprise:
   determining that the indirect block page is corrupt; and
   replacing the indirect block page with the copy of the indirect block.

* * * * *